United States Patent [19]

Amick

[11] 4,162,410
[45] Jul. 24, 1979

[54] VERTICAL-AXIS WINDMILL

[76] Inventor: James L. Amick, 1464 Cedar Bend Dr., Ann Arbor, Mich. 48105

[21] Appl. No.: 856,000

[22] Filed: Nov. 30, 1977

[51] Int. Cl.$^2$ .............................................. F03D 9/00
[52] U.S. Cl. ..................................... 290/55; 310/268; 415/2; 416/DIG. 2
[58] Field of Search ..................... 290/43, 44, 54, 55; 415/2, 3, 4; 416/186 A, 119, DIG. 2; 310/62, 63, 90, 268; 115/3; 98/72

[56] References Cited

U.S. PATENT DOCUMENTS

| | | | |
|---|---|---|---|
| 1,585,566 | 5/1926 | Sindl | 310/268 X |
| 1,835,018 | 12/1931 | Darrieus | 416/119 X |
| 4,012,163 | 3/1977 | Baumgartner et al. | 290/55 |
| 4,039,849 | 8/1977 | Mater et al. | 290/55 |
| 4,047,834 | 9/1977 | Magoveny | 290/55 |

*Primary Examiner*—J. V. Truhe
*Assistant Examiner*—Morris Ginsburg
*Attorney, Agent, or Firm*—Olsen and Stephenson

[57] ABSTRACT

A vertical-axis windmill of the Darrieus type, having much improved power output for a given rotor diameter. The rotor is surrounded by fixed upper and lower contours separated by radial stator vanes. These fixed elements cause an increase in speed of the wind as it impinges on the rotor, with a consequent power increase. The stator vanes and the airfoils of the rotor are easy to manufacture, being straight and untwisted, with constant symmetrical cross sections. The base of the rotor provides a large diameter surface of high peripheral speed for mounting magnets or coils to generate electricity efficiently.

6 Claims, 2 Drawing Figures

VERTICAL-AXIS WINDMILL

BACKGROUND OF THE INVENTION

The present invention relates to windmills and particularly to a windmill of improved efficiency for generating electrical power or for driving mechanically various types of rotary apparatus such as pumps, saws, winches, and the like.

Modern windmills have not yet become economically competitive with other sources of power, except in isolated instances. One reason for this is that the cost of the required structure per unit of power generated is too high.

Since power generated varies as the cube of the wind speed, one effective way to reduce unit costs is to add some fixed structure which increases the speed of the wind past the rotor. This is easy to do if the wind blows from only one direction, but that is not usually the case. Therefore, a fixed omnidirectional speed-increasing structure is needed.

SUMMARY OF THE INVENTION

The present invention improves on previous windmills by increasing the power output of a given rotor size. The principle used is that of the venturi, which captures an airstream and then constricts its cross sectional area, resulting in an inversely proportionate increase in speed.

In one form of the invention, a vertical-axis rotor operates between two fixed axisymmetric surfaces. The gap between the two surfaces decreases from the outer edge inward toward the rotor, causing wind speed to increase as it approaches the rotor. In addition, a ring of fixed, radially-directed vanes surrounds the rotor, causing a further increase in the speed of the wind impinging on the rotor.

The rotor itself is of simple design, so as to be less expensive than other rotors of the same diameter. It consists of upper and lower disks connected by three straight airfoils mounted with their chords aligned in the circumferential direction. Permanent magnets attached to the lower rotor disk interact with fixed coils to generate electricity. Rotor speed is controlled by regulating the power generated. Start-up of the rotor is accomplished with external power, using the generator as a motor.

In summary, a primary object of the present invention is to provide a windmill having increased power output for a given rotor diameter at a given wind speed.

Another object is to provide a windmill that can be easily manufactured.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Figure 2:
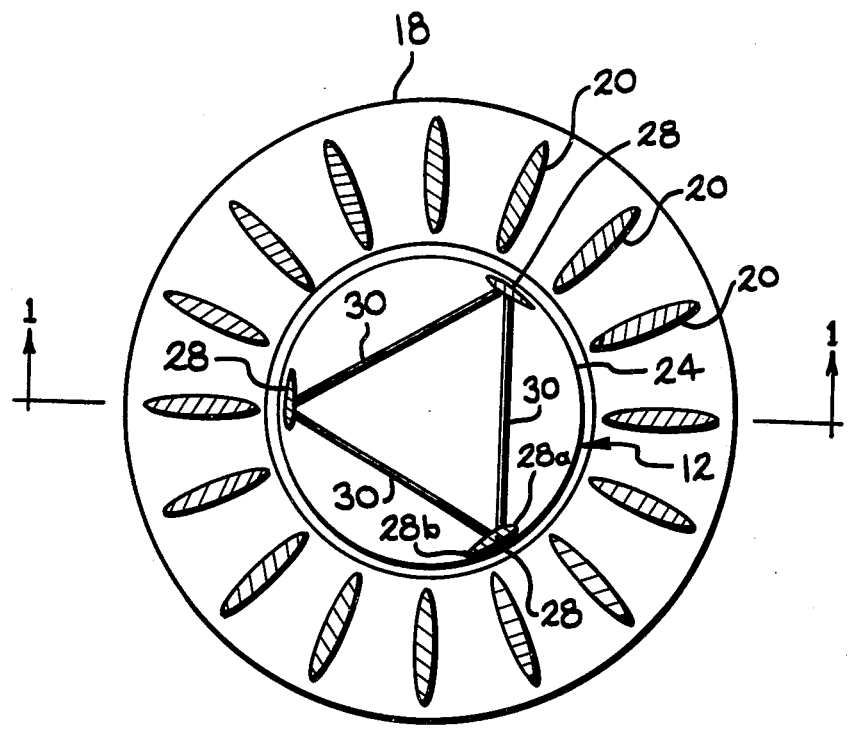
FIG. 2 is a top plan cross section taken on the lines 2—2 of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The windmill 10 has a rotor 12 mounted in bearings 14 in upper stationary support 16 and lower stationary support 18. Upper support 16 is connected to lower support 18 by radial vanes 20 arranged in a circle concentric with the rotor axis and secured rigidly in any conventional manner at their upper and lower ends to the upper support 16 and lower support 18.

The rotor 12 includes the upper and lower disks 22 and 24, having stub axles 26 which fit in bearings 14, the disks being connected together by three airfoils 28. The airfoils 28 have symmetrical cross sections, rounded leading edges 28a, and sharp trailing edges 28b, and they are mounted near the outer edges of the disks 22 and 24 so that leading and trailing edges are equidistant from the axis. Tension wires 30 connect the airfoils 28 at intervals along their height, in order to reduce bending of the airfoils due to centrifugal force.

The inner surfaces of the upper support 16 and the upper rotor disk 22 are substantially flush so as to constitute a single smooth, continuous, axisymmetric, air flow surface, except for the necessary small gap between the moving and fixed parts. The lower support 18 and lower rotor disk 24 make up a similar air flow surface. The flow channel formed by these two surfaces and a pair of adjacent radial vanes 20 decreases in cross sectional area from the outside inward toward the rotor to define a venturi-like throat, so that entering wind must speed up as it approaches the rotor. The vanes also cause the air flow to be more nearly radial. Both of these effects increase the propelling forces on the airfoils 28.

The windmill 10 generates electricity by means of the permanent magnets 32 mounted circumferentially on the bottom of the lower disk 24. The moving magnets 32 interact with fixed electrical generating coils 34 to generate electric current. The rotor speed is controlled by regulating the amount of current generated, in the conventional manner.

The rotor 12 will not usually start turning under wind forces alone. Therefore, start up is accomplished by applying an external source of electric power to the generating coils, causing the magnet-coil combination to act as a motor.

The shapes and proportions of the various parts, as well as the number of rotor airfoils, fixed vanes, tension wires, magnets, and generating coils, depend on specific applications, materials used, etc., and therefore are not specified here. However, the rotor should have at least three airfoils, for structural rigidity. For the same reason, at least three fixed vanes should be used.

The tension wires 30 can be arranged in several ways, ranging from arrangements connecting adjacent airfoils, through arrangements connecting every second airfoil, or every third airfoil, etc., to arrangements of radial wires with or without a central hub. Wires of streamline cross section would be advantageous in many cases.

Figure 1:
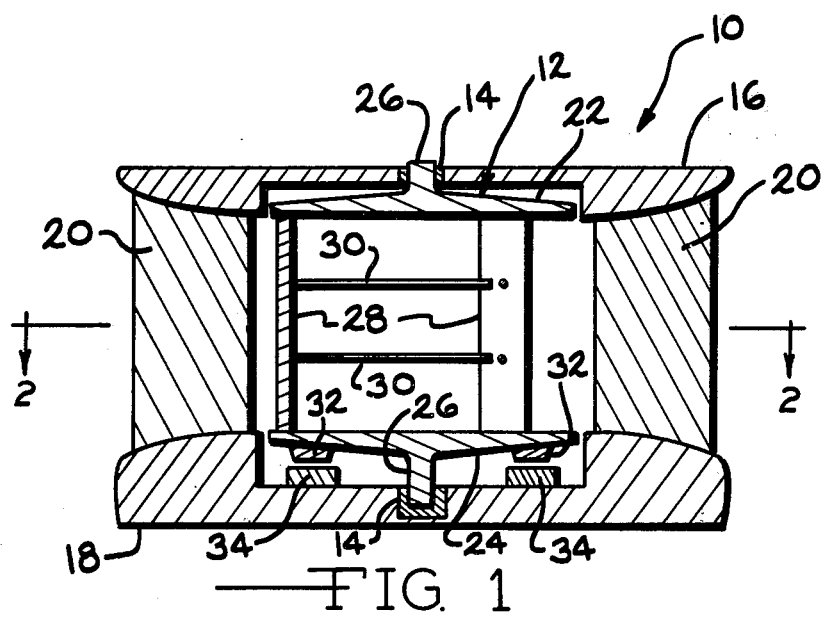
FIG. 1 is an elevational cross section of a preferred embodiment of the invention taken on the lines 1—1 of FIG. 2.

Other types of generators can be used in place of the magnetcoil arrangement shown in FIG. 1. The lower stub shaft 26 can be extended to connect to a self-contained generator.

The windmill can also be used to drive other equipment, (not shown), such as pumps, saws, winches, etc. For these purposes, the extended lower shaft may be connected to a starting motor, and in some instances to a clutch and transmission.

It is claimed:

1. A vertical-axis windmill comprising a rotor having upper and lower disks in spaced relationship and three straight symmetrical airfoils fixedly attached to said upper and lower disks adjacent to the outer circumferences thereof, said airfoils being aligned circumferentially relative to said disks in equiangular relationship and with the leading and trailing edges of the airfoils equidistant from the axis of said disks, and a stator having upper and lower stationary supports of greater radial dimensions than said disks and defining axisymmetric surfaces in which said disks are recessed, said surfaces having a gap between them outward of said rotor that increases in a vertical direction with increasing distance from said rotor, and a ring of at least three straight vertical vanes of symmetric cross section connected to said stationary supports radially outward of said disks, said vanes being aligned radially relative to the axis of said rotor so as to define with said surfaces outward of said rotor venturi-like throats leading radially inward to said airfoils.

2. The vertical-axis windmill that is defined in claim 1, wherein tension wires are connected to and extend between said airfoils to reduce bending of the airfoils due to centrifugal force.

3. The vertical-axis windmill that is defined in claim 1, wherein said disks have stub axles directed toward said supports, and the supports carry bearings in which said stub axles are mounted.

4. The vertical-axis windmill that is defined in claim 1, wherein said disks are recessed into said axisymmetric surfaces to a depth so that the axially inner surfaces of the disks are substantially flush with the radially inner portions of the axisymmetric surfaces outward of said rotor that cooperates to define the venturi-like throats.

5. The vertical-axis windmill that is defined in claim 1, wherein said rotor and said stator are relatively rotatable components that have means responsive to the relative rotation for generating power for transmission to power utilizers.

6. The vertical-axis windmill that is defined in claim 5, wherein said means includes electrical generating coils mounted on one of said components adjacent to the outer circumference of the rotor, and magnets mounted on the other of the components in close proximity to said generating coils.

* * * * *